United States Patent [19]

Watanabe et al.

[11] 4,371,107
[45] Feb. 1, 1983

[54] WELDING MACHINE

[75] Inventors: Toshihiko Watanabe, Kamakura; Naoki Takeuchi, Chigasaki; Soichi Tsuruga; Tadatsugu Koishi, both of Kamakura, all of Japan

[73] Assignee: Kobe Steel, Ltd., Kobe, Japan

[21] Appl. No.: 324,082

[22] Filed: Nov. 23, 1981

Related U.S. Application Data

[63] Continuation of Ser. No. 89,740, Oct. 31, 1979, abandoned.

[30] Foreign Application Priority Data

Oct. 31, 1978 [JP] Japan .................. 53-134994

[51] Int. Cl.³ .................. B23K 9/12; B23K 37/02
[52] U.S. Cl. .................. 228/32; 219/124.31; 219/137.2; 228/41; 228/45
[58] Field of Search .................. 228/25, 32, 41, 45; 219/124.31, 124.33, 137.2, 137.44, 137.8

[56] References Cited

U.S. PATENT DOCUMENTS 2,432,495 12/1947 Baird .
2,439,740 4/1948 Johnson .
2,480,311 8/1949 Tyrner .
2,726,620 12/1955 Meissner .................. 228/41 X
3,527,918 9/1970 Fielder et al. .................. 228/45
3,543,810 12/1970 Scheller .................. 219/137.8 X
3,764,777 10/1973 Sakabe .
3,920,946 11/1975 Takahashi et al. .................. 228/45 X
4,101,755 7/1978 Uratani .................. 228/45
4,205,774 6/1980 Madden et al. .................. 228/32

Primary Examiner—Kenneth J. Ramsey
Attorney, Agent, or Firm—Oblon, Fisher, Spivak, McClelland & Maier

[57] ABSTRACT

A welding machine is disclosed which includes a wire supply device, a wire coil, a flexible wire guide connected between the wire supply device and a torch nozzle and a welding assembly alterable in more than one welding position and mounted on a wheeled platform. The axis or width center position of the wire coil and the axis of a supply roll in the wire supply device or a supply slot in the supply roll are placed above the center line on the overall width of the wheeled platform. Both handed welding is possible by switching the torch between the left handed side and right handed side of the wheeled platform.

7 Claims, 14 Drawing Figures

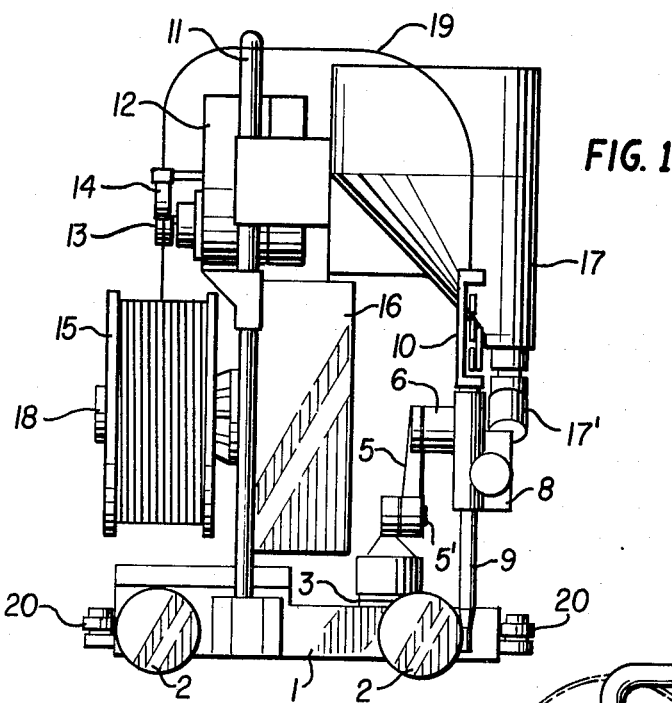
FIG. 1
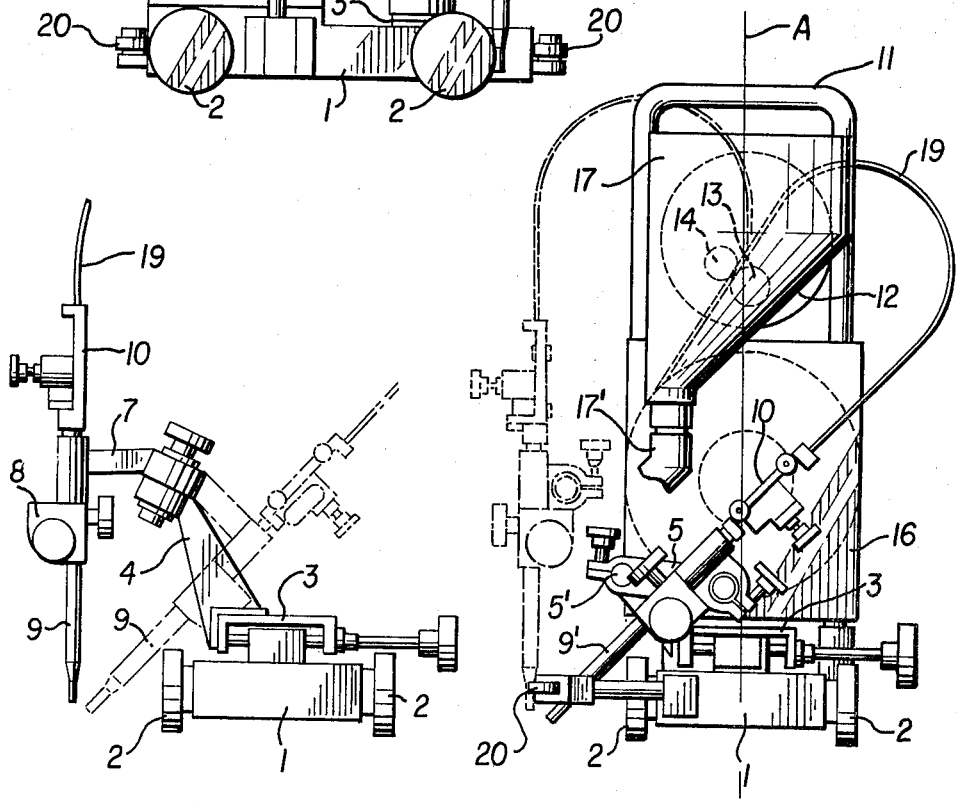
FIG. 3
FIG. 2

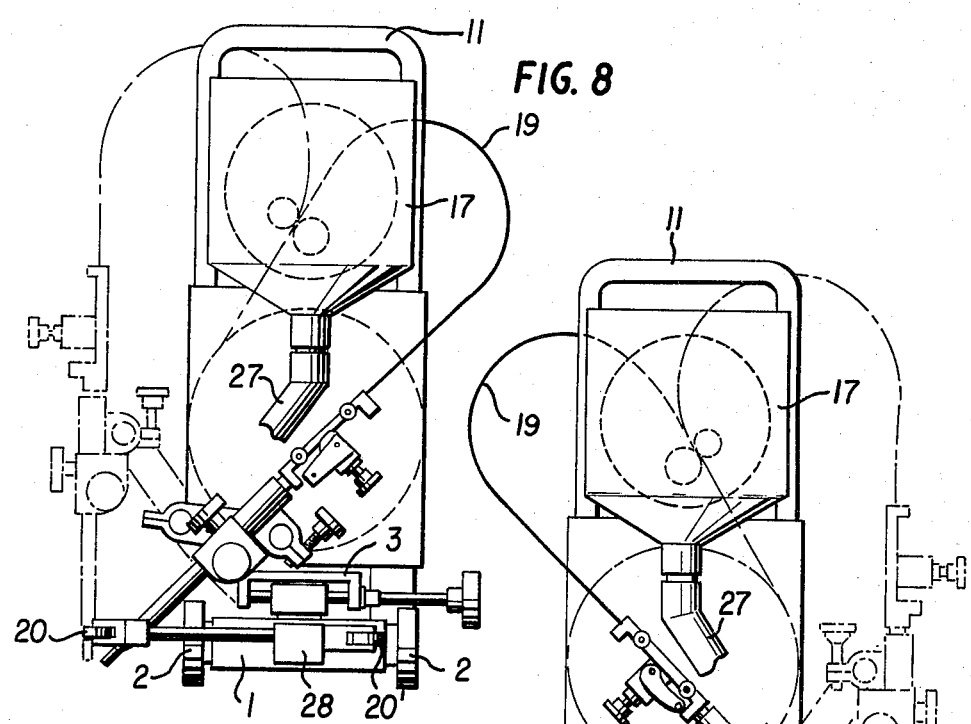
FIG. 8
FIG. 9
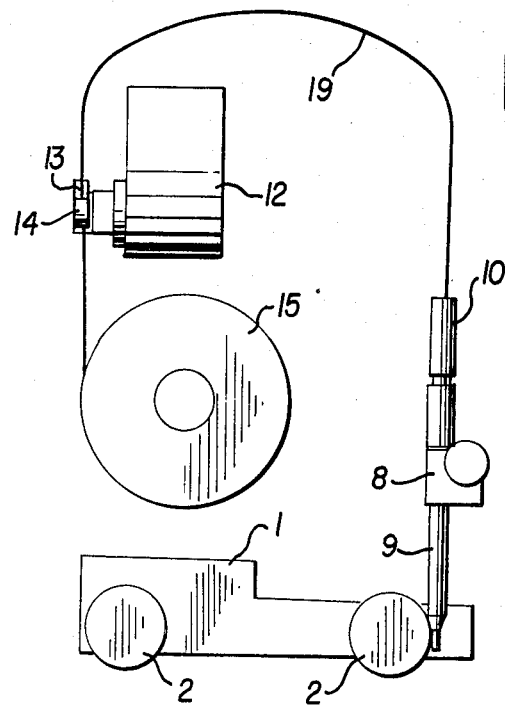
FIG. 10
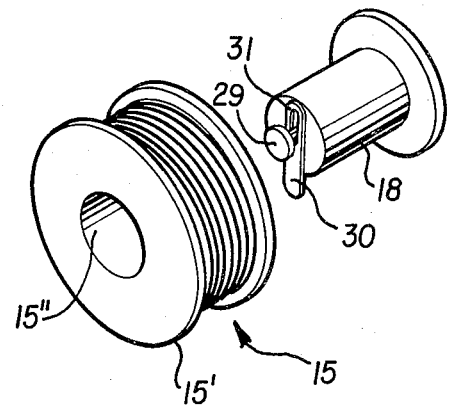
FIG. 11

WELDING MACHINE

This is a continuation of application Ser. No. 89,740, filed Oct. 31, 1979 and now abandoned.

BACKGROUND OF THE INVENTION

1. Field of the Invention

This invention relates to a welding machine, and more particularly to a welding device in which a welding assembly mounted on a wheeled platform may be positioned in either of two selectable welding positions, a wire core is supplied and smoothly guided, and the overall operation is stable.

2. Description of the Prior Art

The one-machine, one-welding position concept was customary in the art of auto welding machines except where a welding object required all-position welding on a continuous basis. In recent years there have been developed auto welding machines movable into two welding positions and capable of achieving both horizontal fillet welding and flat position welding with the same configuration. There are two types of position converters for welding machines: the provision of an attachment for conversion from a primary welding position to a second welding position and the provision of a rotary shaft at an intermediate point between two changeable welding positions for rotation of a wire supply device. The former, however is disadvantageous in that conversion is laborous and requires special fittings. While the latter is advantageous as to manipulability over the former, it is necessary to change the fittings for the wire supply device when it is desired to alter the angle of a torch nozzle since the wire supply device is mounted integrally with the torch nozzle. In other words, a welding wire from the wire supply device must be guided to the torch nozzle in a rectilinear fashion so that the torch nozzle and the wire supply device are held integrally and in a linear positional relationship. To this end, for auto welding machines with wheeled platforms but limited space, there is the need to change the fittings for the wire supply devices at the time of altering the welding position. It is therefore desirable to exploit welding machines which are easily alterable in welding position without changing the fittings for the wire supply devices.

In most conventional devices, either the left or right side of the wheeled platform is located along the weld line. Whereas the wire supply device is positioned above the wheeled platform in a horizontal fillet welding position, upon changing to a flat welding position, the torch nozzle is positioned right above the weld line and the wire supply device integral with the nozzle extends from the platform into the weld line side so that the equilibrium thereof is lost. To maintain balance, the wheeled platform must be provided with a weight so as to be heavier than otherwise necessary. This results in inconveniences when manipulating and driving the machine. It is desirable that auto welding machines be as light in weight as possible to gain manipulability. The supply wire (full load) occupies the largest percent of the overall weight of the machine and the wire supply device occupies the second largest. While the center of gravity of the overall machine is determined mainly by those two components, there is the requirement that the center of gravity be unvariable to ensure stable traveling movements of the platform regardless of whether the torch nozzle changes in position.

As discussed previously, auto welding machines are adapted such that the weld line is located on either the left side or the right side of the wheeled platform. The prior art auto welding machines are either so-called left handed devices or right handed devices which are available on only one side of the weld line with the traveling direction being changed for the other side. There is a requirement for a new automated welding machine that is available on both sides of the weld lines despite a fixed traveling direction.

SUMMARY OF THE INVENTION

As a consequence of various studies, the present invention provides a new and useful device which fulfills the above discussed requirements and more particularly is a device in which it is easy and convenient to change the position of a torch nozzle to various welding positions and stabilize the movement of the wheeled platform.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a side view of an auto welding machine according to an embodiment of the present invention;

FIG. 2 is a front view of the machine viewed from the right side of FIG. 1 with a different welding position;

FIG. 3 is a front view of another example of a part of FIG. 2;

FIG. 8 is a front view of still another embodiment of the present invention;

FIG. 9 is an explanation view of a conversion from FIG. 8;

FIG. 10 is a wire connection view;

FIG. 11 is a perspective view of how to install the wire; and

DETAILED DESCRIPTION OF THE PREFERRED EMBODIMENTS

Figure 4:
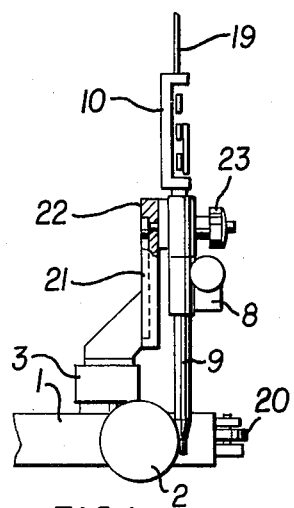
FIGS. 4 and 5 are side and front views showing another embodiment of the present invention.

FIG. 1 is a side view of an auto welding machine according to the present invention and FIG. 2 is a front view of the welding machine taken from the right side of FIG. 1 with a torch nozzle in a different welding position than in FIG. 1. Referring to these drawings, a travelling platform 1 has wheels 2. A pair of the wheels 2 may be directly driven or all of the wheels 2 may be free wheels. In the latter case the platform is driven by a trailer. If necessary, profiling rollers 20 may be installed in back and front of the wheeled platform 1. Legs of a pipe frame 11 carrying an operational box 16, a wire reel fixing shaft 18, a wire supply device 12 and a flux hopper 17 are affixed to the top of the wheeled platform. The wire reel fixing shaft 18 removably supports a rotatable reel 15' which reel contains a wire 15 wound thereon. An appropriate stop member is provided to prevent the wire reel from falling off of the shaft 18. The wire supply device 12 has a self-contained drive mechanism and an extended output shaft, of which the tip carries a supply roll 13. A pressure roll 14 is spaced against the supply roll 13 to advance the wire therebetween. The wire supply device 12 is disposed above a wire winding reel and also positioned on an longitudinal center line of the platform 1 in order to assure a stable operation of a welding machine in which the supply roll 13 and the pressure roll 14 are assembled in such a manner that the wire is fed upward in a direction of the angle from 20° to 70°, preferably 30° to 60° to the horizontal level whereby a torch nozzle 9 is changeable from the flat welding position to the horizontal fillet welding position without the replacement of the wire winding reel.

Through the use of a level adjusting device 8 the torch nozzle 9 is adjustable in the axial direction thereof. The level adjusting device 8 is held on an integral or separate retainer 6. The retainer 6 is mounted on a support member 4 fixed to a sliding adjustment plate 3 on the wheeled platform 1 via an arm 5. As indicated in FIGS. 1 and 2, a pivot 5' is formed normal to the longitudinal direction of the arm 5 (namely, the travelling direction of the wheeled platform) on the side opposite to the side where the support member is mounted. The arm 5 is rotatable on the pivot 5' and can stop at any angular position. A similar pivot is provided at the other end of the arm 5 for holding the retainer 6. The arm 5 is therefore rotatable only in a plane normal to the travelling direction of the wheeled platform and changeable from the position marked by the dotted line in FIG. 2 to that marked by the solid line, the former indicating a flat welding position and the latter indicating a horizontal fillet welding position. Those angular positions are freely selectable by the rotation of the arm 5 and the fastening force of the retainer 6. The arm 5 may include a plurality of rotatable arm segments and the pivot 5' may be provided either on the support member 4 or on the arm 5.

A wire corrector or straightener 10 is installed behind the torch nozzle 9. While the wire corrector 10 may take various forms, the wire corrector 10 is affixed to the torch nozzle 9 directly or via the retainer 6 according to the present invention. It is recommended that the wire corrector 10 itself be freely rotatable about a wire passing therein. A wire guide 19 is interposed between the outlet of the wire supply device 12 and the wire corrector 10. The wire guide 19 should comprise a flexible and substantially nonexpansive tube such as a spirally wound metal tube, otherwise a hunting of the wire will occur in feeding the wire and the wire happens to be buckled in a wire guide by a resistance force imposed on by the wire corrector 10. According to the present invention the wire guide 19 is of an extended length of which the ends are respectively secured to the wire inlets and outlets of the wire supply device 12 and the wire corrector 10. The flux hopper 17 is provided with a short pipe not shown for spreading flux over the weld line and, if necessary, for recovering residual flux in cooperation with a recovery device after welding. With such an arrangement, the torch nozzle 9 is easily changeable from the flat welding position to the horizontal fillet welding position at an appropriate slanting angle by altering the position relationship between the arm 5 and the retainer 6. Alternatively, a rotatable bent arm 7 held directly on the support member 4 as viewed from FIG. 3 may replace the above described rotatable arm 5. When the rotatable arm 7 is loosened and the torch nozzle 9 is moved to the position as denoted by the dotted line 9', the arm 7 may be rotated so that the arc spot of the torch nozzle 9 is oriented toward a specific point and held at a different welding position. The slanting angle also is freely selectable within the revolution of the torch nozzle.

Figure 5:
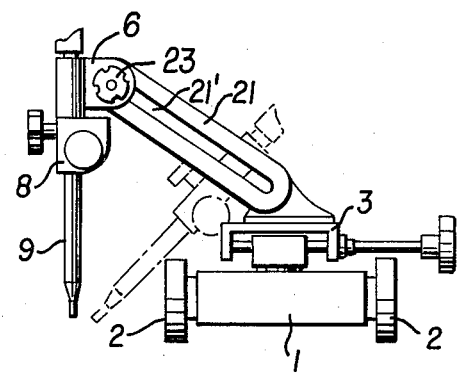
Figure 6:
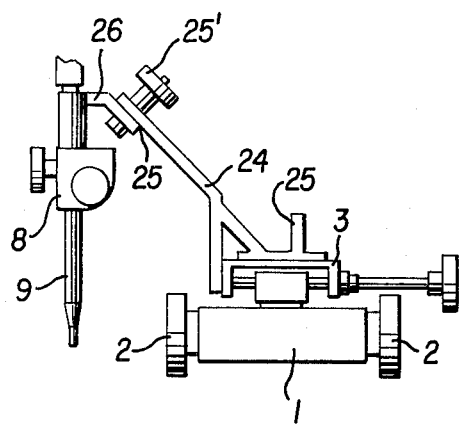
Figure 7:
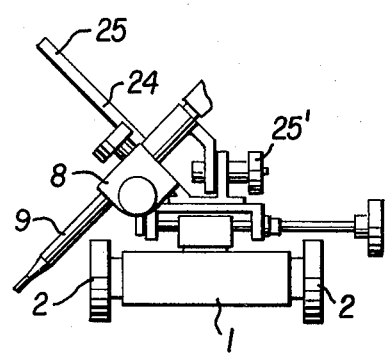
FIG. 7 is a front view showing conversion operation in FIG. 6.
Figure 12:
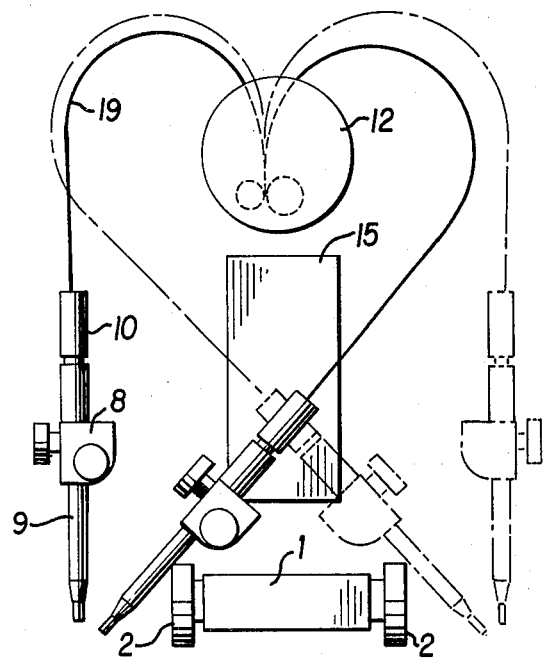
FIGS. 12 through 14 are schematic views showing a wire supply device, a wire reel and conversion of the welding position.

The position conversion can be effected in another embodiment shown in a side view in FIG. 4 and a front view in FIG. 5 which relies upon a side bracket 21. An elongated slit 21' is formed in the side bracket 21 secured on the side base 3. An extended step section is formed on one side of the slit 21' for receiving a core 22 and the retainer 6 for the torch nozzle 9. The torch nozzle 9 is held, and positioned by handle 23, in the horizontal fillet welding position as denoted by the dotted line or the flat welding position as denoted by the solid line. The slanting angle is also selectable at any desired position. A bracket 24 having separate individual mounting surfaces as indicated in FIGS. 6 and 7 may take the place of the side bracket 21. The bracket 24 having the torch nozzle mounting surfaces 25 and 25' is secured on the slide base 3. The torch nozzle can assume the flat welding position (FIG. 6) or the horizontal fillet welding position (FIG. 7) by changing the mounting surface.

It is desirable that the center of gravity of the overall welding machine be unshiftable when the torch nozzle 9 and the wire corrector 10 are displaced, that the wire supply device 12 smoothly feed the wire for every welding position and that the welding operation may be available on both sides of the machine. For these reasons the centers of the wire supporting shaft 18 and the supply roll 13 within the wire supply device 22 are in alignment with the normal line A extending toward the center width position of the wheeled platform 1 and the wire supply device 12 is disposed above the coiled wire 15 (FIG. 2).

Figure 13:
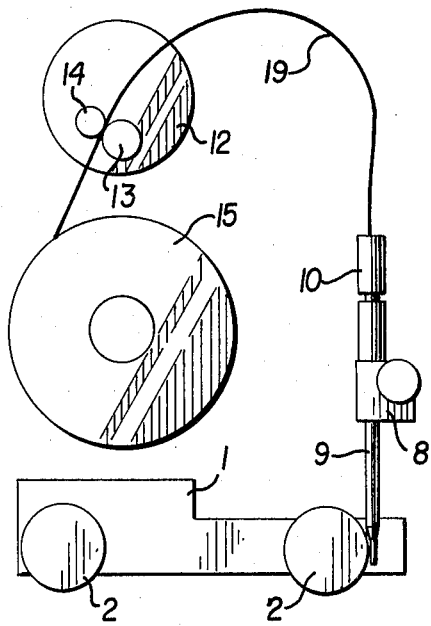
Figure 14:
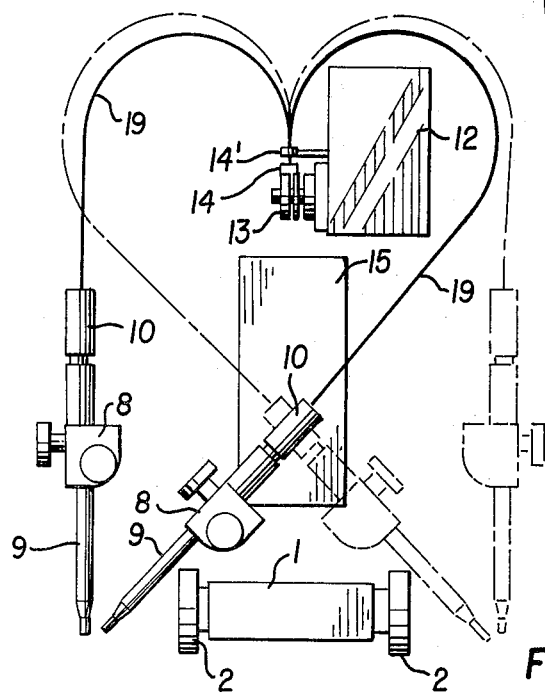

To enable both left and right handed welding, as shown in a front view of FIG. 8, a both handed flux chute pipe 27 is provided within the flux hopper 17 and a profiling roller 20' is disposed on the opposite side of profiling roller 20 within the support member 28. As illustrated in FIG. 9, the welding machine is moved to an opposite side welding position through a 180° rotation of the slide base 3. Of course, the torch nozzle 9 can be held on either side in the flat welding position as denoted by the dotted line or the horizontal fillet welding position as denoted by the solid line. The wire guide 19 is interposed between the wire supply device 12 and the wire corrector 10 to smoothly feed the wire 15 even when the torch nozzle 9 is moved. It is desirable however that the wire feeding direction of the wire supply device 12 be altered with the movement of the torch nozzle 9 in the horizontal fillet welding position. The supply roll 13 is free to rotate but the pressure roll 14 must press the feed roll from the opposite side as seen in FIGS. 8 and 9. At this time the feeding direction of the wire 15 may be altered. It would then only be necessary to replace the wire winding reel to alter the drawing direction of the wire 15. It is however desirable that a stop member as depicted in FIG. 11 be provided at the insertion end of the wire reel shaft 18 to facilitate exchange and to prevent escape of the reel from the shaft. A stop screw 29 is secured about the center of the point of the reel shaft 18 to fix a slide bar 30. The slide bar 30 is of a length shorter than the diameter of the reel shaft 18 and has a longitudinal slit 31 at its center portion and a fastening screw 29. With the above stop device the slide bar 30 is held against the reel shaft 18 so that the reel shaft 18 is freely detachable from an opening 15" in the wire reel 15'. After the reel 15' is slid about the reel shaft 18, the stop screw is loosened to allow one end of the slide bar 30 to extend from the outer periphery of the reel shaft 18 as shown by the dotted line and thereby prevent the reel 15' from becoming dismounted from the reel shaft 18. If the reel shaft 18 is freely rotatable, then even if the stop screw 29 is unfastened, the slide bar 30 will slide due to gravity so that its one end extends from the outer periphery of the reel shaft 18 to prevent the reel 15' from escaping. Although the reel shaft 18 for the wire 15 is disposed along the travelling direction of the wheeled platform in the foregoing embodiments, it is obvious that the wire 15 may be positioned in a direction normal to the travelling direction of the wheeled platform 1 as suggested in FIG. 10 or the supply roll 13 of the wire supply device may be disposed in the axial direction as the wire as shown in FIGS. 13 and 14. Since the supply roll 13 of the wire supply device is located above the center line on the overall width of the wheeled platform under all circumstances, the wire guide 19 follows the wire corrector 10 associated with the torch nozzle 9 and alterable in position and helps the supply device smoothly feed the wire in any welding position.

The above described welding machine according to the present invention offers the following advantages:
(1) the welding position is very easily alterable,
(2) the wire supply operation is smooth,
(3) operation of the welding machine is stable and the travelling actions also are stable to thereby ensure high quality welding,
(4) the welding machine is small and light in weight, and
(5) a general purpose welding machine is economically available.
(6) The welding working range becomes wider and the working property is much improved.

Those advantages are contributive to a higher efficiency of auto welding machines. The welding machine according to the present invention is applicable to not only submerged arc welding but also TIG. or $CO_2$ welding.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A welding machine comprising:
    a wheeled platform movable along a predetermined path and having a longitudinal center line and sides lateral to said path;
    a torch support fixed to said platform;
    a welding torch movably supported by one end of said torch support for movement into at least one welding position on each of said lateral sides;
    a coiled wire reel rotatably fixed to said platform and rotatable about an axis contained in a vertical plane passing through said center line;
    wire supply means fixed to said platform above said reel and disposed about said vertical plane and composed of a wire supply drive mechanism, a supply roll located on said vertical plane and a pressure roll positionable against said supply roll;
    a rotatable wire corrector affixed to one end of said torch; and
    a flexible and substantially nonexpansive wire guide connecting said wire supply means and said wire corrector, whereby the mounting of said wire supply means to said platform above said reel and disposed about said vertical plane enhances the stability of said machine in any welding position.

2. The welding machine of claim 1, wherein said welding torch is movable into one of a flat and horizontal fillet welding position on each said side of said platform.

3. The welding machine of claim 2 wherein said torch support includes a rotatable arm and said torch is movable to said flat and horizontal fillet welding positions by the rotation of said arm.

4. The welding machine of claim 2 wherein said torch support includes two mounting surfaces and said torch is movable to said flat and horizontal fillet welding positions by mounting said torch on a respective one of said mounting surfaces.

5. The welding machine of claim 2 wherein said torch support includes an arm rotatable in a plane normal to said center line and having one end, said torch being pivotally fixed to said one end, the rotation of said arm and the pivoting of said torch moving said torch into one of flat and horizontal fillet welding positions.

6. The welding machine of claim 1, wherein said torch support includes means permitting the rotating of said torch support whereby said torch may be positioned to said other side of said platform while said coiled wire reel and said wire supply means remain stationary relative to said vertical plane.

7. The welding machine of claim 1, wherein said supply roll and said pressure roll are located on said vertical plane and disposed in such a manner that a wire is delivered upward in a direction of the angle from 30° to 60° to the horizontal level.

* * * * *

UNITED STATES PATENT AND TRADEMARK OFFICE
CERTIFICATE OF CORRECTION

PATENT NO. : 4,371,107

DATED : February 1, 1983

INVENTOR(S) : TOSHIHIKO WATANABE ET AL

It is certified that error appears in the above-identified patent and that said Letters Patent is hereby corrected as shown below:

In column 1, line 13, after "guided," insert --both left handed and right handed weldings are possible--;

In column 1, line 30, delete "laborous" and insert therefor --laborious--;

In column 4, line 33, delete "22" and insert therefor --12--.

Signed and Sealed this

Twenty-seventh Day of September 1983

[SEAL]

Attest:

GERALD J. MOSSINGHOFF

Attesting Officer     Commissioner of Patents and Trademarks